Oct. 5, 1965   H. W. BOOK   3,210,704
ELECTRICAL INDUCTIVE APPARATUS HAVING INTERLEAVED WINDINGS
Original Filed Jan. 13, 1959

WITNESSES:
Bernard R. Gieguey
Clement L. McHale

INVENTOR
Herbert W. Book
BY
F. E. Crowder
ATTORNEY

United States Patent Office 3,210,704
Patented Oct. 5, 1965

3,210,704
ELECTRICAL INDUCTIVE APPARATUS HAVING INTERLEAVED WINDINGS
Herbert W. Book, Hickory Township, Mercer County, Pa., assignor to Westinghouse Electric Corporation, Pittsburgh, Pa., a corporation of Pennsylvania
Continuation of application Ser. No. 786,468, Jan. 13, 1959. This application Dec. 27, 1962, Ser. No. 248,839
10 Claims. (Cl. 336—183)

This application is a continuation of copending application Serial No. 786,468, now abandoned, filed Jan. 13, 1959 in the name of Herbert W. Book, and assigned to the same assignee as this application.

This invention relates to electrical inductive apparatus such as transformers and, more particularly, to the windings of such apparatus.

An important problem in applying conventional transformers in an electrical distribution system relates to the voltage regulation in said distribution system. The problem of voltage regulation in an electrical distribution system is due to a number of factors which include the overall impedance of the transformers which form part of the distribution system and the voltage drops between said transformers and the various loads connected to said distribution system by the lines or feeders of said system. One method which has been employed to improve the voltage regulation in a distribution system is to provide the transformers included in the system with some type of tap-changing equipment and either manual or automatic means for operating the tap-changing equipment, either under no-load conditions or while a load is connected to the associated transformer. The latter method of improving voltage regulation has several disadvantages. For example, the voltage at the load connected to each transformer can only be changed in steps and additional problems are introduced into the maintenance of each transformer and its associated tap-changing equipment.

A second method of improving voltage regulation in an electrical distribution system is disclosed in copending application Serial No. 745,555, now abandoned, filed June 30, 1958, by Arthur M. Lockie and assigned to the same assignee as the present application. The latter copending application discloses a winding construction which provides a predetermined capacitance between the adjacent turns of the different windings of an electrical inductive apparatus such as a transformer. The capacitance provided by the latter construction is effectively connected in parallel or in shunt with one of the windings of a transformer as disclosed and may be employed to substantially cancel or compensate for the lagging power factor reactive voltage drop due to the magnetizing component of the exciting current of said transformer which would otherwise be present. The capacitance provided by the construction disclosed in said copending application is effectively connected in shunt with one of the windings of a transformer since the voltage drop across said capacitance is substantially independent of the load current flowing in said transformer. In certain applications, it is desirable to provide a predetermined capacitance between the windings of a transformer in which the voltage drop across said capacitance varies with the load current being carried by the transformer in order to compensate for at least a portion of the voltage drop across the overall impedance of said transformer and for at least a portion of the voltage drop across a feeder line connected to said transformer in an electrical distribution system. It is also desirable that the construction of the latter transformer include the advantages provided by the construction disclosed in said copending application with respect to uniform voltage stress applied to the insulation between the windings, to the mechanical strength, and to the space factor of said transformer.

It is an object of this invention to provide a new and improved electrical inductive apparatus, such as a transformer.

Another object of this invention is to provide a predetermined capacitance between the different windings of an electrical inductive apparatus such as a transformer, the voltage drop across said capacitance varying with the load current being carried by said apparatus.

A further object of this invention is to provide a predetermined capacitance between the windings of an electrical inductive apparatus such as a transformer, said capacitance being effectively connected in series with one of said windings.

Other objects of the invention will, in part, be obvious and will, in part, appear hereinafter.

For a fuller understanding of the nature and objects of the invention, reference should be had to the following detailed description taken in connection with the accompanying drawing, in which.

Figure 1:
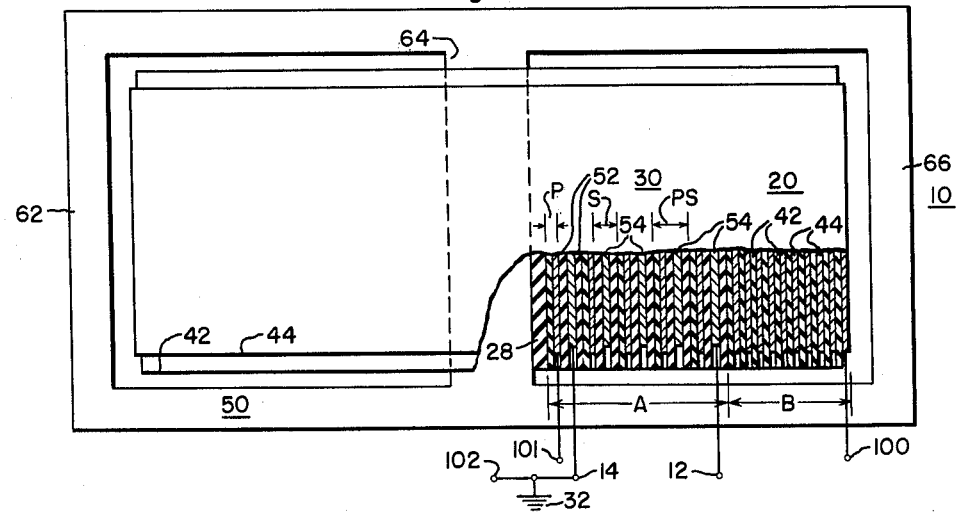
FIG. 1 is a front elevational view, partly in section and partly schematic, of a transformer core and coil assembly illustrating one embodiment of this invention.

Referring now to the drawing and FIG. 1 in particular, there is illustrated a transformer core and coil assembly 10 including a first winding 20 and a second winding 30 which are both inductively disposed on a magnetic core structure 50. The magnetic core 50 includes two windows which are formed by the first and second outer leg members 62 and 66 respectively and a middle or winding leg member 64 on which the first and second windings 20 and 30, respectively, are inductively disposed. The winding leg member 64 is enclosed or surrounded by a supporting member, specifically a tube or barrier 28, on which the first and second windings 20 and 30, respectively, are wound.

In particular, the first or primary winding 20 comprises a plurality of turns of a first layer of conducting sheet material 44 and a second layer of insulating sheet material 42 which are generally spirally wound together about a portion of the magnetic core 50, specifically the winding leg member 64 in this particular case. Although the magnetic core 50 is illustrated as being of the shell form type, it is to be understood that the teachings of the invention may be incorporated in core and coil assemblies including magnetic cores of other types, such as those of the core form type. The width of the insulating sheet or film material 42 is preferably greater than the width of the layer of conducting sheet or foil material 44 in order to provide additional "creep" insulation between the adjacent turns of the first winding 20. The tube or barrier 28 provides mechanical support for the first and second windings 20 and 30, respectively, and may be formed from insulating material in certain applications to insulate said windings from the winding leg member 64 of the magnetic core 50. The conducting material 44 and the insulating material 42 are both of a general type in which the axial dimension of the material is relatively large compared to the radial dimension. Each turn of the first winding 20, as indicated at P, includes only a layer of the insulating material 42 and a layer of the conducting material 44.

Similarly to the first winding 20, the second winding 30 also includes a plurality of turns of a layer of conducting sheet material 54 and two layers of insulating sheet material 52 which are disposed on opposite sides of the conducting sheet material 54. In particular, each turn of the second winding 30 includes two layers of the insulating sheet or film material 52 and a layer of conducting sheet or foil material 54 disposed therebetween, as indicated at S in FIG. 1. Similarly to the first winding 20, and for the same reasons the width of the layer of insulating sheet material 52 of the second winding 30 is preferably greater than the width of the layer of conducting sheet material 52. In general, the turns of the second winding 30 are wound simultaneously with and continuously interleaved with at least a portion of the turns of the first winding 20, as shown in FIG. 1.

In particular, the turns of the first and second windings 20 and 30, respectively, are wound simultaneously in the portion of the overall core and coil assembly 10 as indicated at A. Each turn of the combined first and second windings 20 and 30, respectively, includes one layer of insulating sheet material 42, one layer of conducting sheet material 44, two layers of insulating sheet material 52 and one layer of conducting sheet material 54, as indicated at PS in FIG. 1. As described, the turns of the second winding 30 are wound simultaneously with a portion of the turns of the first winding 20 and continuously interleaved with the adjacent turns of the first winding 20 in the portion of the windings, as indicated at A, for a purpose which will be explained hereinafter. After the combined turns of the first winding 20 and the second winding 30 have been wound, as indicated at A, the final portion of the first winding 20, as indicated at B in FIG. 1, is wound with a plurality of turns, each of which includes only the layer of insulating sheet material 42 and the layer of conducting sheet material 44. The turns of the second winding 30 therefore start and stop at first and second predetermined turns of the first winding 20, one end turn of each of the first and second windings 20 and 30, respectively, being preferably disposed adjacent to each other for reasons which will be discussed hereinafter. In other words, in a preferred embodiment, the winding of the first or end turns of each of the first and second windings 20 and 30, respectively, would be started together or at the same time as shown in FIG. 1. Considering the connections of the first and second windings 20 and 30, respectively, as shown in FIG. 1, the inner end or turn of the conducting sheet material 44 of the first winding 20 is connected to the terminal 101. The outer end or turn of the layer of conducting sheet material 44 of the first winding 20 is connected to the terminal 100. The inner end or turn of the layer of conducting material 54 of the second winding 30 is connected to the terminal 14. The outer end or turn of the layer of conducting material 54 is connected to the terminal 12. The inner end or turn of the second winding 30 at the terminal 14 is connected to the ground connection 32 and to the terminal 102. It is important to note that the inner end of the conducting sheet material 44 of the first winding 20, as indicated at the terminal 101, is not normally intended or adapted for connection to an external alternating current circuit or source (not shown) for reasons which will be discussed hereinafter.

Figure 2:
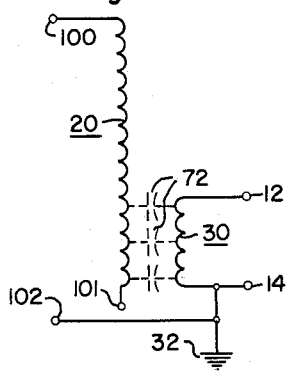
FIGS. 2, 3 and 4 are equivalent schematic diagrams of the windings of the transformer core and coil assembly shown in FIG. 1.

The manner in which the first winding 20 and the second winding 30 are constructed or arranged with the adjacent turns of the respective windings being continuously interleaved has several important results. Referring to FIG. 2, there is illustrated an equivalent schmeatic diagram of the first and second windings 20 and 30, of the transformer core and coil assembly 10 shown in FIG. 1. Because of the insulating and conducting materials employed and the manner in which the turns of the first and second windings 20 and 30, respectively, are continuously interleaved, a predetermined capacitance results between the adjacent turns of the first and second windings 20 and 30, respectively, as shown in FIG. 2. As illustrated, only the outer end or turn of the first winding 20 is adapted for connection to an external alternating current circuit or source, as indicated at the terminal 100. The inner end of the first winding 20 as indicated at the terminal 101 is not adapted for a physical electrical connection to an external circuit and is merely left "floating." The second winding 30 is connected across the terminals 12 and 14 which are connected to the outer and inner ends, respectively, of the second winding 30. The terminal 14 of the second winding 30 is connected to the ground connection 32 and also to the terminal 102. In a typical application, the terminals 100 and 102 would be connected to an external alternating current circuit or source (not shown) and the terminals 12 and 14 of the second winding 30 would be connected to a second alternating current circuit or load circuit (not shown). The inherent distributed capacitance between the adjacent turns of the first and second windings 20 and 30, respectively, is indicated at 72. It is important to note that any load current flowing from the first alternating current circuit connected at the terminals 100 and 102 would have to flow through the portion B of the first winding 20 and then through a network formed by the combined turns of the first and second windings 20 and 30, respectively, as indicated at A in FIG. 1 and the distributed capacitance 72.

Figure 3:
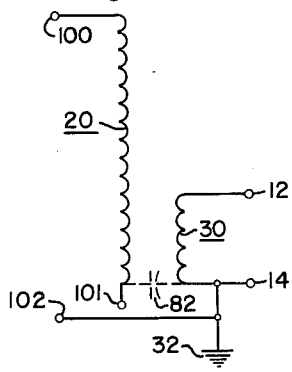
Figure 4:
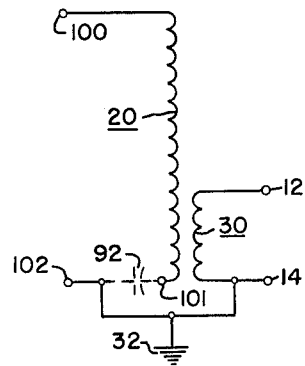

The capacitance 72 varies with several factors. For example, the capacitance 72 varies with the effective areas of the turns of the layers of conducting material 44 and 54 included in the first and second windings 20 and 30, respectively. The capacitance 72 also varies with the dielectric constant and the thickness of the layers of insulating material 42 and 52 included with the first and second windings 20 and 30, respectively. Since the current through the distributed capacitance 72 varies with or is dependent upon the current which flows to a load (not shown) connected across the second winding 30 at the terminals 12 and 14 when a potential is applied between the terminals 100 and 102, an equivalent schematic diagram of the first and second windings 20 and 30, respectively, may be represented on a lumped equivalent basis, as shown in FIG. 3. The effect of the distributed capacitance 72 between the adjacent turns of the first and second windings 20 and 30, respectively, may be represented as an effective single lumped capacitance 82 as shown in FIG. 3, which has the effect of a capacitance connected in series with the first winding 20, the series circuit being connected between the terminals 100 and 102. An alternate equivalent lumped schematic diagram is shown in FIG. 4 in which the effect of the distributed capacitance 72 shown in FIG. 2 is represented as a single lumped capacitance 92 which is effectively connected in series with the first winding 20, the series circuit being connected between the terminals 100 and 102 to a first alternating current circuit or source (not shown). In FIG. 4, the terminal 102 and the terminal 14 of the second winding 30 are illustrated as being connected to a common connection, specifically to the ground connection 32.

As seen from FIGS. 2, 3 and 4 discuseed above the winding 20 has a greater number of turns than the winding 30. This different number of turns provides a ratio of transformation between the windings 20 and 30.

The effect of the capacitance 72, shown in the schematic diagram of FIG. 2, which is provided between the adjacent turns of the first and second windings 20 and 30, respecively, as a reactance also varies with the square of the potential of the voltage applied across the insulation between the first and second windings 20 and 30, respectively, considered as a dielectric material. The turns of the second windings 30 are only wound simultaneously with a portion of the turns of the first winding 20. Because the adjacent turns of the first and second windings 20 and 30 are continuously interleaved, the potential difference or stress across the insulation or dielectric material between the adjacent turns of said windings is substantially uniform. The construction shown in FIG. 1 is therefore preferred since the inner end of the second winding 30 is connected to a ground connection and the winding of the inner end turns of each of the first and second windings 20 and 30, respectively, is started together and the voltage across the insulation between the adjacent turns of said windings, considered as a dielectric, will be substantially negligible when no current is flowing to a load connected to the second winding 30. The latter arrangement obviously minimizes the requirements of the insulation which is provided between the adjacent turns of the first and second windings 20 and 30, respectively. The substantially uniform voltage stress across the insulation between the turns of the first and second windings 20 and 30, respectively, also results in more efficient utilization of the insulation as compared to a conventional transformer.

When the voltage across the insulation between the adjacent turns of the first and second windings 20 and 30 respectively is arranged to be substantially negligibile when no load current is flowing in said windings, the effect of the capacitance provided between the adjacent turns of said windings in the construction shown in FIG. 1 and shown schematically in FIGS. 2 through 4 is that of a capacitance effectively connected in series with the first winding 20. When a load circuit is connected to the second winding 30 and load current begins to flow in the second winding 30, the voltage stress across the insulation between the adjacent turns of the first and second windings 20 and 30, respectively, would increase with said load current to thereby provide a capacitance effect which is equivalent to a capacitance connected in series with said first winding. The latter series capacitance could be designed to compensate for at least a portion of the voltage drop across the overall impedance of the transformer core and coil assembly 10 and possibly a portion of the voltage drop in an associated feeder line connected between said transformer core and coil assembly and a load.

The manner in which the substantially uniform voltage stress results across the insulation between the adjacent turns of the windings 20 and 30 is similar to the voltage stress discussed in detail for the winding construction disclosed in copending application Serial No. 745,555 previously mentioned. Briefly, if an alternating current potential is applied between the terminals 100 and 102, the potential will distribute itself substantially uniformly with respect to the turns of the first winding 20. If the voltage stress between the adjacent initial turns of the first and second windings 20 and 30, respectively, is arranged to be substantially negligible, as shown in FIG. 1, the voltage stress between the adjacent turns of the respective windings as additional turns are added will remain at a substantially negligible value under no-load conditions. Since the insulation between the adjacent turns of the first and second windings 20 and 30 is substantially uniform, the insulation is more efficiently utilized and the space factor of a transformer core and coil assembly is improved compared to a conventional transformer in which the insulation is normally stressed in a non-uniform manner.

Figure 5:
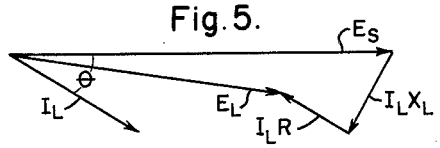
FIGS. 5 and 6 are vector diagrams of some of the voltages and currents associated with the transformer core and coil assembly shown in FIG. 1.
Figure 6:
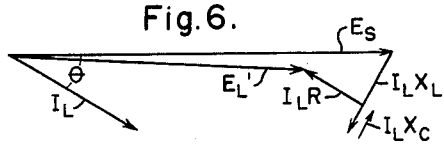

Referring to the vector diagrams of FIGS. 5 and 6, the manner in which the capacitance provided between the adjacent turns of the first and second windings 20 and 30, respectively, affects the operation of the core and coil assembly 10 shown in FIG. 1 is illustrated. The vector diagram of FIG. 5 illustrates the operation of a conventional transformer core and coil assembly 10 in an electrical distribution system in the absence of the predetermined capacitance between the adjacent turns of the first and second windings 20 and 30, respectively. The vector, $E_s$, represents the applied potential across the first winding 20 between the terminals 100 and 102. The vector, $E_L$, represents the voltage across a load circuit which may be connected to the second winding 30 at the terminals 12 and 14 through a feeder line. The vector, $I_L$, represents the load current which flows from the second winding 30 at the terminals 12 and 14 and lags the supply voltage, $E_s$, by a phase angle $\theta$. The vectors, $I_L X_L$, $I_L R$, represent the normally lagging power factor reactive voltage drop and the resistive voltage drop, respectively, of the transformer core and coil assembly 10 alone, or in combination with those of an associated feeder line connected at the terminals 12 and 14 of the second winding 30.

In the absence of the predetermined capacitance between the adjacent turns of the first and second windings 20 and 30, respectively, the magnitude of the load voltage $E_L$ is reduced from that of the supply voltage $E_s$ because of the resistive voltage drop $I_L R$ which is in phase with the load current $I_L$ and the normally lagging power factor reactive voltage drop $I_L X_L$ which lags the load current by substantially 90°.

Referring to FIG. 6, the manner in which the capacitance provided between the adjacent turns of the first and second windings 20 and 30, respectively, affects the magnitude of the load voltage $E_L$ is illustrated. The vectors shown in FIG. 6 correspond to the vectors shown in FIG. 5 except for the vector voltage $I_L X_C$ which represents the effective voltage drop across the predetermined capacitance between the adjacent turns of the first and second windings 20 and 30 of the transformer core and coil assembly 10 which varies with the load current $I_L$ flowing in the second winding 30 at the terminals 12 and 14. The effect of the voltage across the predetermined capacitance between the adjacent turns of the first and second windings 20 and 30, respectively, which is effectively connected in series with the first winding 20 is to offset or cancel out at least a portion of the normally lagging power factor reactive voltage drop $I_L X_L$ as shown in FIG. 6 since the vector $I_L X_C$ is substantially 180° out of phase with the vector $I_L X_L$. The net reactive voltage drop in the core and coil assembly 10 alone, or in combination with the reactive voltage drop of an associated feeder line, between said core and coil assembly and a load is reduced by the presence of the predetermined capacitance between the adjacent turns of the first and second windings 20 and 30, respectively, of the transformer core and coil assembly 10 to thereby increase the magnitude of the load voltage $E'_L$ which corresponds to the load voltage $E_L$ shown in FIG. 5. In a particular application, it may be desirable to provide a predetermined capacitance such that the leading power factor reactance of said capacitance exceeds the normally lagging power factor reactance of a transformer core and coil assembly alone or in combination with that of an associated feeder line which connects the transformer core and coil assembly to a load.

The effect of the predetermined capacitance provided between the adjacent turns of the first and second windings 20 and 30 of the transformer core and coil assembly 10 can also be compared to that of a conventional separate series capacitor which is sometimes employed in electrical distribution systems to improve voltage regulation. Referring to the Electrical Transmission and Distribution Reference Book by Central Station Engineers of the Westinghouse Electrical Corporation, published in 1950, page 256, the voltage drop through a feeder line where a series capacitor is employed can be approximated as follows:

$$IR \cos \theta + I(X_L - X_C) \sin \theta$$

which corresponds to Formula (18) on page 256 of said reference book. I represents load current. R represents the resistance of the feeder line alone or in combination with the effective resistance of an associated transformer core and coil assembly. $X_L$ represents the lagging power factor reactance of the feeder line alone or in combination with the effective lagging power factor reactance of the associated transformer. $X_C$ represents the leading power factor reactance of the effective series capacitance provided in a transformer core and coil assembly as disclosed. $\theta$ represents the power factor angle. It can be seen that if $X_C$ is substantially equal to $X_L$, the reactive component of the voltage drop in a feeder line alone, or in combination with an associated transformer, is substantially eliminated. If $X_C$ exceeds $X_L$, the second term of the formula becomes negative and the resistive voltage drop in a feeder line alone or in combination with an associated transformer is also reduced. The latter method of overcompensation can be similarly employed in a transformer core and coil assembly as disclosed in a particular application where the resistive component of the transformer impedance alone or in combination with the resistive component of the feeder line impedance indicates that further improvement in voltage regulation can be obtained by providing a predetermined capacitance in the transformer core and coil assembly having a reactance which exceeds the normally lagging power factor reactance of the transformer core and coil assembly alone or in combination with an associated feeder line which connects said transformer core and coil assembly to a load.

It is to be understood that other forms of electrical inductive apparatus incorporating the teachings of the invention may be provided with different arrangements of the insulation between the turns of the respective windings. For example, instead of using separate layers of sheet or film insulation between the turns of the first or second windings 20 or 30 respectively, the layers of conducting sheet material may be coated with an insulating material, such as enamel, and the edges of the turns of the respective winding could be coated with other suitable insulating material, such as resins, to provide insulation between the turns of each winding, between the adjacent turns of the respective windings or between said windings and the core structure or ground. In addition, while the windings as disclosed inherently have excellent heat dissipation characteristics, it may be advisable or necessary in larger ratings to incorporate or wind in conventional duct formers to provide additional cooling. Since there is no potential difference present along the vertical axis of the respective turns of each winding, as disclosed, the latter duct formers could be formed from a material having a high thermal conductivity, such as a metal bar or plate.

It is also to be understood that in higher ratings of transformers where the use of relatively massive conducting material is objectionable because of mechanical difficulty in winding turns of such material or because of excessive eddy current losses, two or more winding groups may be wound in accordance with the teachings of this invention and assembled on a common core. An alternative arrangement would replace the single layers of conducting material with a plurality of layers of conducting material disposed adjacent to each other in a radial direction and wound into a single winding group. It is to be noted that additional insulation of the conventional type (not shown) may be added between the windings 20 and 30, as shown in FIG. 1, and the magnetic core 50 or where required in particular parts of the first and second windings 20 and 30, respectively. It is also to be understood that one or more of the windings included in a transformer as disclosed may include layers of conducting material divided transversely with respect to the vertical axis of said windings. In addition, the over-all shape of the windings included in an assembly as disclosed may be circular, rectangular or any other shape incorporating the teachings of the invention.

The apparatus embodying the teachings of this invention has several advantages. First, the construction disclosed includes many of the advantages of the construction disclosed in copending application Serial No. 745,555, now abandoned, as previously mentioned, with respect to the reduction of exciting current and the associated losses, with respect to the reduced lagging power factor reactive component of the impedance of a transformer, and the same advantages with respect to improved mechanical strength and improved space factor. In addition, the winding construction as disclosed has several further advantages.

A first additional advantage is that the capacitance between the windings of a transformer as disclosed is effectively connected in series with one of the windings of said transformer to provide a leading power factor compensation which varies with the load current being carried by said transformer. The latter features are effective to improve the voltage regulation of an electrical distribution system on a continuous basis, rather than in steps as a conventional tap changing transformer.

A second additional advantage provided by the winding construction disclosed is that the predetermined capacitance between the adjacent turns of the different windings of the transformers disclosed may be utilized to improve voltage regulation while the voltage stress across the insulation between the different windings, considered as a dielectric, is reduced to a negligible value in a preferred embodiment of the invention.

A final advantage provided by the winding construction disclosed is that improvement in voltage regulation is obtained by static means which includes no moving parts, such as are employed in conventional tap changing equipment. Even though no moving parts are employed in the construction disclosed, the improvement in voltage regulation varies in accordance with the load current being carried by a transformer rather than being independent of the load current carried by the transformer. In other words, the compensation provided by the construction disclosed is responsive to the load current being carried by a transformer rather than being responsive only to the voltage applied to one of the windings of a transformer.

Since numerous changes may be made in the above described apparatus and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. Electrical inductive apparatus for connection to an alternating current source and a load circuit comprising a magnetic core, a first winding including a plurality of turns of electrically conductive sheet material disposed in inductive relation with said magnetic core, a second winding including a plurality of turns of electrically conductive sheet material disposed in inductive relation with said first winding, said first and second windings having a different number of turns to provide a ratio of transformation between said windings, the turns of said second winding being continuously interleaved with a portion of the turns of said first winding to provide a predetermined capacitance between the adjacent turns of said first and second windings, electrical insulating means disposed between the turns of said first and second windings, one end of each of said first and second windings being adapted for connection to different sides of said alternating current source, said first winding being connected to the other side of said alternating current source through said capacitance, said second winding being adapted for connection to the load circuit.

2. A transformer for connection to a source of alternating current and a load circuit comprising a magnetic core, a first winding including a plurality of turns of electrically conductive sheet material having a coating of insulation on at least one side and disposed in inductive relation with said magnetic core, a second winding disposed in inductive relation with said first winding and including a plurality of turns of electrically conductive sheet material having a coating of insulation on at least one side, said windings having a different number of turns to provide a ratio of transformation between the windings, the turns of said first and second windings being spirally wound together about a portion of said core and continuously interleaved to provide a predetermined capacitanec between the adjacent turns of said first and second windings, one end of each of said first and second windings being adapted for connection to opposite sides of said alternating current source, said first winding being connected to the opposite side of said alternating current source through said capacitance, said second winding being adapted for connection to the load circuit.

3. Electrical apparatus comprising a magnetic core, a first winding including a plurality of turns of electrically conductive sheet material and insulating sheet material disposed in inductive relation with said magnetic core, a second winding disposed in inductive relation with said first winding and including a plurality of turns of electrically conductive sheet material and at least one layer of insulating sheet material, said first and second windings having a different number of turns to provide a ratio of transformation between said windings, the turns of said second winding being wound simultaneously with at least a portion of the turns of said first winding and being continuously interleaved with the adjacent turns of said first winding to provide a predetermined capacitance, one end of said first winding and one end of said second winding being adapted for external connection to opposite sides of an alternating current source, said first winding being adapted for energization through said capacitance, said second winding being adapted for connection to a load circuit.

4. A transformer for interconnecting first and second alternating current circuits comprising a magnetic core, a first winding including a plurality of turns of electrically conductive sheet material disposed in inductive relation with said magnetic core, a second winding disposed in inductive relation with said first winding and including a plurality of turns of electrically conductive sheet material, the turns of said second winding being continuously interleaved with the adjacent turns of said first winding to provide a predetermined capacitance between the adjacent turns of said first and second windings, electrical insulating means disposed between the turns of said first and second windings, the number of turns in said first and second windings being different to provide a ratio of transformation between said windings, one end of each of said first and second windings being adapted for connection to opposite sides of said first circuit and both ends of said second winding being adapted for connection to said second circuit, the other end of said first winding being electrically insulated from the side of said first circuit which is not directly connected to said first winding, said first winding being connected to the opposite side of the first circuit through said capacitance, and the voltage across said capacitance varying with the current flow in said second winding.

5. Electrical inductive apparatus for connection between a source of alternating current and a load circuit comprising a magnetic core, a first winding including a plurality of turns of electrically conductive sheet material disposed in inductive relation with said magnetic core, a second winding disposed in inductive relation with said first winding and including a plurality of turns of electrically conductive sheet material, insulating means disposed between the turns of said first and second windings, the number of turns in said first and second windings being different to provide a ratio of transformation between said windings, the turns of said second winding being wound with and continuously interleaved with a portion of the turns of said first winding to provide a predetermined capacitance between the adjacent turns of said first and second windings, one end of each of said first and second windings being adapted for connection to opposite sides of said alternating current source and both ends of said second winding being adapted for connection to said load circuit, said one end of said first winding being the only end of said first winding adapted for external connection, the circuit from the end of said first winding connected to one side of the alternating current source being completed to the other side of said alternating current source through said capacitance.

6. A transformer for connection to an alternating current source and a load circuit comprising a magnetic core, a first winding including a plurality of turns of a layer of electrically conductive sheet material and a layer of insulating sheet material spirally wound together on said magnetic core, a second winding including a plurality of turns of a layer of electrically conductive sheet material and at least one layer of insulating sheet material, the number of turns in said first and second windings being different to provide a ratio of transformation between said windings, the turns of said second winding being continuously interleaved with a portion of the turns of said first winding to provide a predetermined capacitance between the adjacent turns of said first and second windings, the voltage stress between the adjacent turns of said first and second windings being substantially uniform when said alternating current source is applied to said transformer, one end of each of said first and second windings being adapted for connection to opposite sides of said alternating current source, said first winding being connected to the opposite side of said alternating current source through said capacitance, said second winding being adapted for connection to the load circuit.

7. In a transformer adapted for interconnecting first and second alternating current circuits each having at least first and second terminals, a magnetic core, a first winding including a plurality of turns of electrically conductive sheet material and a layer of insulating sheet material disposed in inductive relation with said core, a second winding disposed in inductive relation with said first winding and including a plurality of turns of a layer of electrically conductive sheet material and a layer of insulating sheet material, the number of turns in said first and second windings being different to provide a ratio of transformation between said windings, the turns of said second winding being continuously interleaved with a portion of the turns of said first winding to provide a predetermined capacitance between the adjacent turns of the respective windings, one end of said first winding being adapted for connection to the first terminal of said first circuit, the other end of said first winding being electrically insulated from the second terminal of said first circuit, the opposite ends of said second winding being adapted for connection to the respective terminals of said second circuit, one end of said second winding being adapted for connection to the second terminal of said first circuit, said first winding being connected to the second terminal of the first circuit through said capacitance.

8. A transformer comprising a magnetic core, a first winding including a plurality of turns of electrically conductive sheet material, said first winding having input terminals, a second winding disposed in inductive relation with said first winding and including a plurality of turns of electrically conductive sheet material, said second winding having output terminals connected to bridge a predetermined number of turns which is different than the number of turns in said first winding, the turns of said first and second windings being spirally wound together about a portion of said core and continuously interleaved to provide a predetermined capacitance between the turns of said first and second windings, insulation means insulating the turns of said windings from each other, one point of each of said first and second windings being connected to said input terminals, and means comprising said capacitance completing the connection of said first winding to said input terminals, which capacitance is in series circuit relationship with the input terminals of said transformer, said transformer being capable of transforming voltage dependent upon the ratio of turns in said first and second windings.

9. A transformer comprising a magnetic core, a first winding including a plurality of turns of electrically conductive sheet material, input terminals for said first winding disposed to bridge a predetermined number of turns, a second winding disposed in inductive relation with said first winding and including a plurality of turns of electrically conductive sheet material, output terminals for said second winding disposed to bridge a different number of turns than bridged by the input terminals on said first winding, the turns of said first and second windings being spirally wound together about a portion of said core and continuously interleaved to provide a predetermined capacitance between the adjacent turns of said first and second windings, said first and second windings being connected to a common one of said input terminals, said first winding being connected to another of said input terminals, said first winding being electrically connected to said common input terminal through said capacitance between said first and second windings.

10. A transformer comprising a magnetic core, a first winding including a plurality of turns of electrically conductive sheet material, said first winding having input terminals, a second winding comprising a plurality of turns of electrically conductive sheet material, said second winding having output terminals, the turns of said first and second windings being spirally wound together about a portion of said core and continuously interleaved to provide a predetermined capacitance between the turns of said first and second windings, means insulating the turns of said first winding from the turns of said second winding, said first and second windings having a different number of turns to provide a ratio of transformation between the windings, one point on said first winding being connected directly to one of said input terminals, another point on said first winding being connected to another input terminal through said capacitance, and means connecting said second winding to said output terminals and one of said input terminals.

References Cited by the Examiner
UNITED STATES PATENTS

| | | | |
|---|---|---|---|
| 2,521,513 | 9/50 | Gray | 336—183 X |
| 3,068,433 | 12/62 | Wroblewski et al. | 336—223 X |
| 3,086,184 | 4/63 | Nichols | 226—206 |

JOHN F. BURNS, *Primary Examiner.*

LARAMIE E. ASKIN, *Examiner.*